Aug. 11, 1931.  G. H. BOWLUS  1,818,297
BELT CLAMP
Filed March 25, 1930
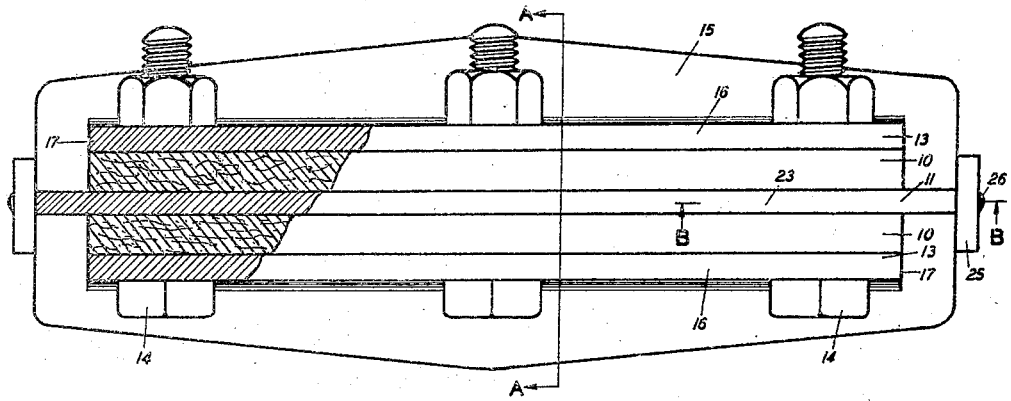
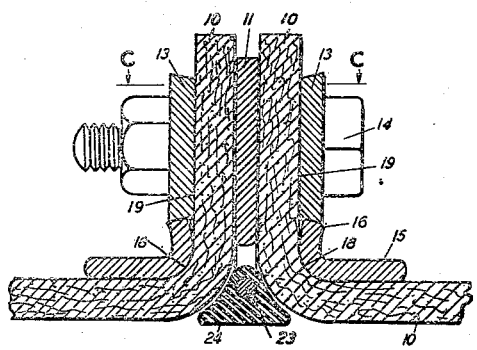
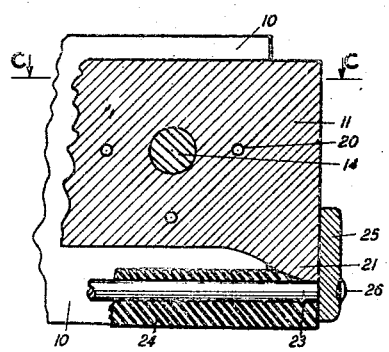
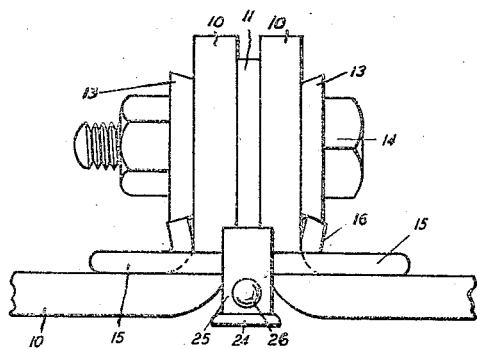
GLENN H. BOWLUS
*INVENTOR*
ATTORNEY Patented Aug. 11, 1931

1,818,297

UNITED STATES PATENT OFFICE

GLENN H. BOWLUS, OF ALHAMBRA, CALIFORNIA

BELT CLAMP

Application filed March 25, 1930. Serial No. 438,749.

The object of my invention is to provide a clamp for joining the ends of a belt running over pulleys.

Large belts in heavy service, such as the wide and relatively slow-moving belts used around oil drilling and producing rigs, are not readily joined to form an endless band by means of lacings such as are used with lighter belts. It is customary to form endless bands from heavy duty belts by squaring and upturning the ends, bringing the upturned faces into contact, forming holes through the upturned portions and bolting them together by means of two flat bars having corresponding holes, the bars and bolts being left on the belt and running with it in service.

My invention is an improvement over the aforesaid method of joining the ends of the belt, and it will be understood that it has nothing to do with means used for bringing the ends of the belt together, these means being properly belt tighteners though often termed belt clamps.

The objects and advantages of my invention will be evident from an inspection of the attached drawings and the following description thereof in which, Fig. 1 is a plan section of my improved belt clamp in place on the ends of a belt, the section being taken as on C—C of Figs. 2 and 3.

Fig. 2 is a cross section on A—A of Fig. 1.

Fig. 3 is a partial longitudinal section as on B—B of Fig. 1, and

Fig. 4 is a cross section taken along the line A—A of Fig. 1.

Referring to the figures, 10—10 are the upturned ends of a belt; 11 is a spacing bar placed between the two upturned and parallel ends; 13—13 are flat bars placed outside the upturned ends and used to hold them firmly against the spacing bar, and 14—14 are bolts passing through the above described members.

15 may be a relatively thin but stiff metal plate having its central portion upturned as indicated at 16 in Figs. 1 and 2. Such plate may be formed from a flat plate by making cross slots or saw cuts as indicated at 17—17, near the ends of the plate, and joining the centers of these cuts by a longitudinal cut.

The long and narrow tongues thus left facing toward each other may then be drifted or punched into the position indicated at 16 in Fig. 2, in which they are shown to be bent slightly outward from the vertical. The drift or punch used should be so formed as to produce a smooth and even curvature of the bends indicated at 18 in Fig. 2 in order that the belt may not be abraded by any projections or roughness during the slight travel of the curve of the belt over the curved metal surface when in operation.

It is also within the scope of my invention to cast the plate in the desired shape, in which case it may have upturned edges as shown or may be made of sufficient thickness throughout or adjacent to the slot to permit the curvature 18 to be formed without turning the edges upward.

The spacing bar 11 should be so designed as to take the firmest possible grip on the adjacent surfaces 19—19 of the belt. For this purpose it may be provided with small rivets having sharp projecting heads spaced around the bolts 14 as indicated at 20 in Fig. 3, or it may be superficially roughened over its whole surface, as for instance to resemble a wood rasp.

The two ends of the plate 11 are preferably turned downward as indicated at 21 in Fig. 3 and just below these downward projections is placed a rod 23 having a length slightly greater than that of the plate. The object of this rod is to afford a swiveling or pivotal support to a more or less triangular strip of rubber or other flexible material indicated at 24 in Figs. 2 and 3. This rubber strip is designed to fill the gap left between the opposing curvatures of the belt where it passes through the opening in the slotted plate 15, and the use of this strip or its equivalent is important as otherwise an air pocket is formed when the joined ends pass over the pulley and a severe slapping of the belt may result. The rod and the rubber insert are held in place by the small end plates 25 over which the end of the rod may be riveted as at 26.

While I have described the plate 15 as being substantially flat it should be undertsood that it may desirably be given a slight longitudinal curvature to correspond with the lateral curvature of the belt when drawn tight over the crown of the pulley.

In the manner of clamping formerly used, in which two bolted bars corresponding to the members 13—13 were used without the plate 15 above shown, the belt under heavy longitudinal stress was liable to be cut by the inner lower corner of the bar even when this corner was rounded. Furthermore, as the pull of the belt came directly on the lower edges of the bars and thus subjected the bolts to a high bending stress it was difficult or impossible to use enough or strong enough bolts to hold the bars and the belt ends in nonslipping contact.

In my improved device the longitudinal pull of the belt is taken wholly by the solid plate 15, the bars 13 being free to move downward under this pull until the bottom edge of the bar seats solidly on the edge of the slot as shown at 16 in Fig. 2.

The bolts are thus subjected to shearing stress only and the device may be equipped with much smaller bolts which will be capable of maintaining a firm grip for an indefinite period.

The use of the spacing bar 11 and the use of the flexible filler 23 are both optional though they are recommended as subjecting the belt to less jar when the joint passes over the pulley. If the spacing bar be omitted the inner faces of the plates 13 should be roughened as above described to prevent the belt from slipping between the bars under high tension and thus tearing out the bolt holes.

In assembling my device on a belt in place on the pulleys the ends of the belt are brought together by means of any preferred belt tightener and these belt ends upturned. The plate 15 is then placed over the belt with the belt ends projecting upward through the slot in the plate. Plates 13—13 and spacer 11 are already formed with corresponding bolt holes. These plates and the spacer, if used, are put in the position shown in Fig. 2, corresponding holes are cut through the belt, the bolts inserted and drawn tight and any undue projection of the belt ends trimmed off.

If the flexible strip 24 is used it is put in place as a final step, the rod 23 being passed lengthwise through the strip 24, the retainers 25 slipped over the projecting ends of the rod, the rod brought up to contact with the downwardly projecting ends 21 of spacer 11 and the ends of the rod riveted or otherwise fastened to the outer face of the retainer as at 26 in Fig. 3.

I claim as my invention:

1. A clamp for joining the ends of a power-transmitting belt to form an endless band, comprising: a metal plate having a slot adapted to receive the upturned ends of said belt and having its lower corners rounded; a spacing bar adapted to be placed between the upturned ends of said belt, and a plurality of clamping bars and of bolts cooperating to draw said belt firmly against said spacing bar.

2. A device substantially as and for the purpose set forth in claim 1, including a flexible filling strip interposed between the curved upturning ends of said belt, and means for pivotally supporting said strip.

3. A device substantially as and for the purpose set forth in claim 1, including a flexible filling strip interposed between the curved upturning ends of said belt, and means for pivotally supporting said strip from said spacing bar.

4. A clamp for joining the ends of a power-transmitting belt to form an endless band, comprising: a metal plate having a slot adapted to receive the upturned ends of said belt and having its lower edges rounded; clamping bars adapted to grip the projecting ends of said belt and to rest on the upper edges of said slot, and means for holding said bars and said belt ends in nonslipping contact.

5. A device substantially as and for the purpose set forth in claim 4, in which bolts are passed through said bars and said belt ends to hold the same in nonslipping contact.

6. A clamp for joining the ends of a power transmitting belt to form an endless band comprising: a screw actuated means adapted to receive and hold the upturned ends of said belt together under heavy pressure; means for distributing said pressure over a substantial area of belt end; spacing means adapted to fit and be held between the aforesaid holding means; a substantially triangular flexible strip fitting into the substantially triangular hollow space existing immediately below the spacing member upon the side of the belt adapted to be presented to the pulley; means adapted pivotally to hold said flexible strip in operative relation to the belt ends whereby to avoid an air space between said belt ends and a stiff slotted plate adapted to support the holding means with the edges of its slot and to prevent substantial flexure of the belt joint in the direction of the holding means.

In witness that I claim the foregoing I have hereunto subscribed my name this 20th day of March, 1930.

GLENN H. BOWLUS.